United States Patent [19]

St. Clair

[11] Patent Number: 5,922,467

[45] Date of Patent: Jul. 13, 1999

[54] METHOD FOR COATING CROSSLINKABLE EPOXIDIZED MONOHYDROXYLATED DIENE POLYMER COATING COMPOSITIONS ON PRIMED SUBSTRATES

[75] Inventor: David John St. Clair, Houston, Tex.

[73] Assignee: Shell Oil Company, Houston, Tex.

[21] Appl. No.: 08/938,289

[22] Filed: Sep. 26, 1997

Related U.S. Application Data

[60] Provisional application No. 60/028,500, Oct. 15, 1996.

[51] Int. Cl.⁶ .................................................. B32B 15/08
[52] U.S. Cl. ......................... 428/418; 427/410; 428/414; 525/332.9
[58] Field of Search ...................... 525/332.9; 428/414, 428/418; 427/410

[56] References Cited

U.S. PATENT DOCUMENTS

| | | | |
|---|---|---|---|
| 4,237,245 | 12/1980 | Halasa et al. | 252/272 |
| 4,242,468 | 12/1980 | Baack et al. | |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,332,783 | 7/1994 | Dillman et al. | 525/92 |
| 5,500,481 | 3/1996 | St. Clair | 525/92 K |
| 5,750,627 | 5/1998 | St. Clair | 525/162 |

FOREIGN PATENT DOCUMENTS

| | | |
|---|---|---|
| 0396780 A1 | 11/1989 | European Pat. Off. . |
| 0441485 A2 | 1/1991 | European Pat. Off. . |
| 4313762 | 4/1994 | Germany . |
| 62-178718 | 7/1987 | Japan . |
| 2-275256 | 10/1990 | Japan . |
| 2-409745 | 12/1990 | Japan . |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka Japan, Apr. 1991.

*Primary Examiner*—Melvyn I. Marquis
*Assistant Examiner*—D. Aylward
*Attorney, Agent, or Firm*—Donald F. Haas

[57] ABSTRACT

This invention provides a method for painting a substrate which comprises:

(a) priming the substrate with a primer selected from the group consisting of epoxy resin primers and polyester resin primers, (b) applying to the primed substrate a crosslinkable basecoat composition comprising from 10 to 90 percent by weight of an epoxidized monohydroxylated polydiene polymer, from 8 to 60 percent by weight of an amino resin crosslinking agent, and from 2 to 40 percent by weight of a reinforcing agent, and (c) applying over the basecoat a clearcoat selected from the group consisting of epoxidized monohydroxylated polydiene-based clearcoats, polyester clearcoats, and acrylic clearcoats.

6 Claims, No Drawings

METHOD FOR COATING CROSSLINKABLE EPOXIDIZED MONOHYDROXYLATED DIENE POLYMER COATING COMPOSITIONS ON PRIMED SUBSTRATES

CROSSREFERENCE TO PRIOR APPLICATION

This application claims the benefit of U.S. Provisional Application No. 60/028,500, filed Oct. 15, 1996.

FIELD OF THE INVENTION

This invention relates to a novel method for coating on to primed substrates crosslinkable compositions comprised of epoxidized monohydroxylated diene polymers, amino resins and reinforcing agents.

BACKGROUND OF THE INVENTION

Hydroxy functional polydiene polymers are well known. It has been shown that formulations containing these polymers, a melamine resin, and an acid catalyst can be cured by baking under normal bake conditions. Most of these polymers are homopolymers of one diene or another. For example, monohydroxylated polybutadienes are known in the art for use in adhesive formulations. U.S. Pat. No. 4,242,468 describes solventless polyurethane coatings having improved flexibility resulting from incorporation of monohydroxylated polybutadienes. Epoxidized versions of hydroxylated polybutadienes are known as well. Low viscosity epoxidized polydiene polymers are also known, especially for use in adhesives. Such polymers are described in commonly assigned U.S. Pat. Nos. 5,229,464 and 5,247,026.

Compositions based on functional polydiene polymers cured with a crosslinking agent are usually fairly soft and, although they can be very useful in some applications, have limited adhesion. Attempts to increase hardness and adhesion by increasing crosslink density with a reinforcing agent, such as a low molecular weight diol or triol, and higher levels of crosslinking agent were unsuccessful because the reinforcers and crosslinkers are relatively polar and so are incompatible with the relatively nonpolar polydiene polymers. Incompatibility of the components leads to poor properties, such as gloss, in the cured composition or, even worse, the compositions may phase separate upon standing. U.S. Pat. No. 5,500,481 provides a solution to this problem.

The above-referenced patent shows that the compositions described therein adhere well to steel substrates. Data in this application show that the compositions of the above-referenced patent adhere well to thermoplastic polyolefin (TPO) surfaces. However, the data show that not all of the compositions which adhere well to TPO will also adhere to steel. It would be advantageous to have a way to utilize these compositions on steel substrates because, for example, in an end use area such as automotive, the same compositions could be used to coat both the TPO surfaces of the car and its steel surfaces as well. The present invention provides such a method.

SUMMARY OF THE INVENTION

This invention provides a method for painting a substrate which comprises:

(a) priming the substrate with a primer selected from the group consisting of epoxy resin primers and polyester resin primers, (b) applying to the primed substrate a crosslinkable basecoat composition comprising from 10 to 90 percent by weight of an epoxidized monohydroxylated polydiene polymer, from 8 to 60 percent by weight of an amino resin crosslinking agent, and from 2 to 40 percent by weight of a reinforcing agent, and (c) applying over the basecoat a clearcoat selected from the group consisting of epoxidized monohydroxylated polydiene clearcoats, polyester clearcoats, and acrylic clearcoats.

This crosslinkable composition contains an epoxidized monohydroxylated polydiene polymer which is comprised of at least two polymerizable ethylenically unsaturated hydrocarbon monomers wherein at least one is a diene monomer which yields unsaturation suitable for epoxidation, an amino resin crosslinking agent, and a reinforcing agent which has at least two functional groups which will react with the amino resin crosslinker. The preferred epoxidized monohydroxylated polymers are block copolymers of at least two conjugated dienes, preferably isoprene and butadiene, and, optionally, a vinyl aromatic hydrocarbon wherein a hydroxyl group is attached at one end of the polymer molecule. These polymers may be hydrogenated or unhydrogenated.

DETAILED DESCRIPTION OF THE INVENTION

The primers which may be used in the process of the present invention are those which are commonly used as primers for steel substrates including epoxy resin primers and polyester primers. Epoxy resin primers are normally based on the diglycidyl ether of Bisphenol A (DGEBA), such as EPON® 828 resin (Shell Chemical). To prepare the resin, the DGEBA is reacted with Bisphenol A (BPA) to generate a higher molecular weight epoxy resin which has secondary hydroxyl functional groups. The curing agent for this epoxy polyol is typically an amino resin or a polyisocyanate. After being suitably formulated, the epoxy primer can be applied from solution in a solvent such as xylene or it can be applied as a solvent free powder. A particularly desirable method of applying the epoxy primer is by the cathodic electrodeposition (CED) process. A typical resin preparation and formulation of a waterborne epoxy primer which can be applied by the CED process is given in U.S. Pat. No. 4,883,572 which is herein incorporated by reference. Again the DGEBA is reacted with BPA to give a higher molecular weight epoxy polyol. The epoxy groups on the resin are then reacted with a secondary amine, such as methylaminoethanol, and the tertiary amine formed is ionized with an acid, such as lactic acid. The ionic species make the resin dispersible in water. After formulating the resin with suitable curing agent, corrosion inhibitor package and various other components, the primer can be applied and cured by baking, typically for 20 minutes at about 180° C.

Polyester polyols can also be used in the primers. These polyester polyols are also normally cured with amino resins or polyisocyanates. Typically, the polyester polyols are synthesized by carrying out a condensation reaction using a glycol or a mixture of glycols and an anhydride or diacid compound or a mixture of anhydrides or diacid compounds. The condensation reactions typically are done at temperatures of 175 to 235° C. in a resin kettle which is capable of removing the water of condensation. Typical glycols used in the polyester polyol synthesis are the same as the reinforcing agents which are described below for use in the novel coating compositions of this invention. Especially preferred are ethylene glycol, 1,4-butane diol, and neopentyl glycol. The anhydrides and diacids which are frequently used in polyesters for primers are phthalic anhydride, isophthalic acid, and adipic acid. A fairly complete list of hydroxy functional and acid functional compounds which are used in polyesters is given in Bulletin IP-65c, "How to Process Better Coating Resins with Amoco PIA and TMA" from Amoco Chemical Company, 1992.

Polyester primers can be applied from a solution in organic solvent or as a solvent free powder. However, a preferred method of application is as a waterborne coating. The technology for preparation of waterborne polyester coating resins can be found in U.S. Pat. No. 4,054,614 which is herein incorporated by reference. A polyester is prepared which has acid functional groups. These acid groups are neutralized with a tertiary amine, such as dimethylaminoethanol, and the resin is dispersed in water. After formulation with suitable crosslinkers, corrosion inhibitors and any other ingredients necessary to give good performance, the primer is applied and cured by baking, typically for 30 minutes at about 150° C.

Curing agents for the primers are typically amino resins or polyisocyanates. The amino resins which are used are the same types which are described below for use in the compositions of this invention. Polyisocyanates used in primers are usually based on toluene diisocyanate (TDI) or 4,4-diphenyl methane diisocyanate (MDI). These diisocyanates are typically converted to triisocyanates by, for example, condensing 3 moles of diisocyanate to form an isocyanurate ring structure or by reaction of 3 moles of diisocyanate with a triol such as trimethylolpropane. The polyisocyanate will cure the polyol at ambient temperature in a two component coating. Alternatively, the isocyanate groups can be blocked with a volatile blocking agent, such as phenol, and the blocked polyisocyanate will deblock when baked at temperatures of about 180° C., regenerating the polyisocyanate which will cure the polyol.

The primary functions of the primer coating are to prevent corrosion of the substrate, to provide a surface which is smooth or which can be sanded smooth, and to provide a surface to which an additional coating will adhere. It has been found that the coatings of this invention adhere very well to these primers. The coatings of this invention will almost always be pigmented to provide the desired color to the coated part and also to protect the primer against degradation by sunlight and the environment. Thus, they are the "paint" for the substrate. This pigmented coating based on the compositions of this invention will frequently also be coated with a clearcoat coating (clearcoat) to improve the appearance of the coated part and also to protect the pigmented coating against degradation.

Resins for the clearcoat coatings typically will contain either a polyester polyol or an acrylic polyol and the curing agent for the polyol will be either an amino resin or a polyisocyanate. The polyester polyols in the clearcoat are very similar to those in the primer except that only those glycol and acid functional components which have good stability, especially to sunlight, will be used in the polyester synthesis. The acrylic polyols used in clearcoats are made by free radical polymerization, usually in solution in an organic solvent or in a suspension polymerization if the coating will be applied as a powder. There is a wide variety of acrylate and methacrylate monomers which are commercially available for use in acrylics. The acrylic monomers which will be used in polymerization will be selected to give the acrylic polyol the proper properties. Two of the important properties of the acrylic polyol are its glass transition temperature (which will usually be between 0 and 50° C.) and its hydroxy equivalent weight (which will usually be between 200 and 1000). Thus, a typical polymerization might use a combination of methyl methacrylate, butyl acrylate and hydroxy ethyl acrylate.

The crosslinkers for the polyester polyol or acrylic polyol in the clearcoat will be quite similar to those in the primers except that only stable crosslinkers will be used. The amino resins of the type described below for use in the compositions of this invention are used as crosslinkers for bake clearcoats. Only light stable isocyanates will be used. These are based on hexane diisocyanate (HDI), isophorone diisocyanate (IPDI) or 4,4-dicyclohexyl methane diisocyanate (HMDI). These diisocyanates will usually be converted to triisocyanates and they will be blocked if they will be used to cure the polyol in a bake system. The clearcoat coatings will usually be formulated with wetting agents to improve flow and reduce surface defects, and with stabilizers, especially to protect the clearcoat as well as the basecoat against degradation by sunlight.

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, radial or star.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The monohydroxylated polydienes are synthesized by anionic polymerization of conjugated diene hydrocarbon monomers with lithium initiators. This process is well known as described in U.S. Pat. Nos. 4,039,593 and Re.

27,145 which descriptions are incorporated herein by reference. Polymerization commences when a monolithium initiator polymerizes the monomers into a living polymer. Typical monolithium living polymer structures containing conjugated diene hydrocarbon monomers are:

X—A—B—Li

X—A—B—A—Li wherein B represents polymerized units of one conjugated diene hydrocarbon monomer such as butadiene, A represents polymerized units of another conjugated diene monomer such as isoprene, and either A or B may contain one or more vinyl aromatic compounds such as styrene, and X is the residue of a monolithium initiator such as sec—butyllithium. The hydroxyl groups are added by capping the living polymer chain end with ethylene oxide and terminating with a proton donor such as an alcohol.

The preferred monohydroxylated polydiene polymer of the present invention has the structural formula $$(HO)_x\text{—}A\text{—}S_z\text{—}B\text{—}(OH)_y \quad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di—, tri—, or tetra—substituted unsaturation sites (aliphatic double bonds) per unit of block mass than do the B blocks. This produces a polymer wherein the most facile epoxidation occurs in the A blocks. The A blocks have a number average molecular weight of from 100 to 6000, preferably 500 to 4,000, and most preferably 1000 to 3000, and the B blocks have a number average molecular weight of from 1000 to 15,000, preferably 2000 to 10,000, and most preferably 3000 to 6000. S is a vinyl aromatic hydrocarbon block which may have a number average molecular weight of from 100 to 10,000. x and y are 0 or 1. Either x or y must be 1, but only one at a time can be 1. z is 0 or 1. Either the A or the B block may be capped with a miniblock of polymer, 50 to 1000 number average molecular weight, of a different composition, to compensate for any initiation, tapering due to unfavorable copolymerization rates, or capping difficulties. These polymers are epoxidized such that they contain from 0.2 to 7.0 milliequivalents (meq) of epoxy per gram of polymer.

The most highly preferred polymers for use herein are diblock polymers which fall within the scope of formula (I) above. The overall number average molecular weight of such diblocks may range from 1500 to 15000, preferably 3000 to 7000. Either of the blocks in the diblock may contain some randomly polymerized vinyl aromatic hydrocarbon as described above. For example, the diblocks may have the following structures:

I—B—OH  I—B/S—OH  I/S—B—OH  I—I/B—OH or

B/I—B/S—OH  B—B/S—OH  I—EB—OH  I—EB/S—OH or

I—S/EB—OH  I/S—EB—OH  HO—I—S/B  HO—I—S/EB where I represents isoprene, B represents butadiene, S represents styrene and EB represents hydrogenated butadiene, and a slash (/) represents a random copolymer block. The formula —EB/S—OH means that the hydroxyl group is attached to a styrene mer, and —S/EB—OH signifies that the hydroxyl group is attached to a hydrogenated butadiene mer. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer (x=0 and y=1). However, the hydroxyl may also be attached to the isoprene block if desired. This produces a more surfactant-like molecule with less load bearing capacity. The isoprene blocks may also be partially hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I-EB/S-EB-OH  I-B/S-B-OH—I-S-EB-OH  I-S-B-OH or

I-I/S-I-OH  I-S-I-OH  B-S-B-OH  B-B/S-B—OH or

I-B/S-I-OH  I-EB/S—I-OH or

I-B-S-OH  I-EB-S-OH  HO—I-EB-S

The latter group of polymers specified in the last line above wherein the styrene block is external are represented by the formula $$(HO)_x\text{-}A\text{-}B\text{-}S\text{—}(OH)_y \quad (II)$$

where A, B, S, x, and y are as described above. These polymers and the other triblocks shown above are particularly advantageous for introducing blocks of epoxy functionality into the monohydroxylated polymers at multiple sites.

Epoxidation of the monohydroxylated base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent. These methods are described in more detail in U.S. Pat. Nos. 5,229,464 and 5,247,026 which are herein incorporated by reference.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the number average molecular weight should be calculated from the chromatograph and used. The materials used in the columns of the GPC are styrene-divinyl benzene gels or silica gels. The solvent is tetrahydrofuran and the detector is a refractive index detector.

If desired, these block copolymers can be partially hydrogenated. Hydrogenation may be effected selectively as disclosed in U.S. Patent Reissue 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated herein by reference. The polymers may have different diene blocks and these diene blocks may be selectively hydrogenated as described in U.S. Pat. No. 5,229,464 which is also incorporated herein by reference. Partially unsaturated monohydroxylated polymers are preferred for use herein in order to allow for the epoxidation to make the epoxidized polymers of this invention.

The crosslinking agents which are useful in the present invention are amino resins. For the purposes of this invention, an amino resin is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. American Cyanamid (renamed CYTEC) sells a variety of these amino resins, as do other manufacturers. American Cyanamid's literature describes three classes or "types" of amino resins that they offer for sale.

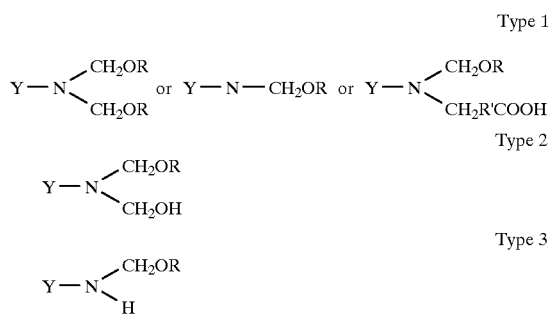

where Y is the material that bore the NH groups, the carbonyl source was formaldehyde and R is the alkyl group from the alcohol used for alkylation. Although this type of description depicts the amino resins as monomeric material of only one pure type, the commercial resins exist as mixtures of monomers, dimers, trimers, etc. and any given resin may have some character of the other types. Dimers, trimers, etc. also contain methylene or ether bridges. Generally, Type 1 amino resins are preferred in the present invention.

The following Type 1 amino resins can be used to achieve the purpose of the present invention: CYMEL® 303—a melamine-formaldehyde resin where R is $CH_3$, CYMEL® 1156—a melamine-formaldehyde resin where R is $C_4H_9$, CYMEL® 1141—a carboxyl modified melamine-formaldehyde resin where R is a mixture of $CH_3$ and $i$—$C_4H_9$, CYMEL® 1170—a glycoluril-formaldehyde resin where R is $C_4H_9$, and BEETLE® 80—a urea-formaldehyde resin where R is $C_4H_9$. All of these products are made by American Cyanamid Company and are described in its publication 50 *Years of Amino Coating Resins*, edited and written by Albert J. Kirsch, published in 1986, along with other amino resins useful in the present invention.

These amino resins generally have fairly good compatibility with the epoxidized monohydroxylated polydiene polymers. However, the amino resins do not necessarily have to be compatible with the polymer and give phase stable mixtures when merely mixed together because the partial prereaction disclosed in this invention can overcome any incompatibility, giving resins which will not phase separate.

The reinforcing agent is a low molecular weight material having at least two functional groups which will react with the amino resin crosslinker when the composition is heated. Suitable functional groups include primary and secondary alcohols and carboxylic acids. The equivalent weight of the reinforcing agent will usually be between about 30 and about 150 grams per functional group, preferably between about 50 and 100 grams per functional group.

Reinforcing agents suitable for use in the present invention include unsubstituted aliphatic diols such as ethylene glycol, 1,3-propane diol, 1,4-butane diol, and 1,6-hexane diol, substituted aliphatic diols such as 1,2-propane diol, 2-methyl-1,3-propane diol (MP-diol from Arco), neopentyl glycol, 2-ethyl-1,3-hexane diol (PEP-diol), 2,2,4-trimethyl-1,3-pentane diol (TMPD diol), and 2-butyl-2-ethyl-1,3-propane diol (BEPD diol), cycloaliphatic diols such as cyclohexane dimethanol and 4,4-isopropylidenedicyclohexanol (HBPA), and aromatic diols such as 4,4-isopropylidenediphenol (Bisphenol A, BPA). Triols such as glycerol, trimethylol ethane and trimethylol propane may also be used. Analogous unsubstituted and substituted carboxylic acids may also be used. Preferred materials for use herein PEP diol, TMPD diol and BEPD diol because they are substituted, branched diols and, as such, is not as incompatible with the polydiene polymers as unsubstituted, straight chain diols.

A proton-donating acid catalyst is required to achieve the purposes of the present invention, i.e., crosslink the polymer and reinforcer using the amino resin crosslinkers described above. It is normal that the amount of the acid catalyst used range from about 0.1 to about 4%w of the polymer/reinforcer/amino resin mixture to be certain there is sufficient acid but an excess can be undesirable. Most preferably, from about 0.5 to about 2%w of the polymer/reinforcer/amino resin is used. The presence of a strong proton-donating acid is normally required to catalyze the crosslinking reaction of many amino resins which are useful in the present invention. However, some medium strength and even relatively weak acids may also be effective depending upon the amino resins used. Generally, the most active catalysts are those with the lowest pKa values. The following list of acid catalysts which may be used in the present invention is arranged according to increasing pKa value: mineral acids, Cycat® 4040 catalyst (p-toluene sulfonic acid), Cycat® 500 catalyst (dinonylnaphthalene disulfonic acid), Cycat® 600 catalyst (dodecyl benzene sulfonic acid), oxalic acid, maleic acid, hexamic acid, phosphoric acid, Cycat® 296-9 catalyst (dimethyl acid pyrophosphate), phthalic acid and acrylic acid. Other acids which may be used are described in the aforementioned American Cyanamid Company publication. Also, 3M Brand Resin Catalyst FC-520 (diethylammonium salt of trifluoromethane sulfonic acid) may be used. Cycat® 600 was found to be a very useful catalyst.

The compatible compositions of the present invention are prepared by mixing the epoxidized monohydroxylated polydiene polymer, the amino resin crosslinker, and the reinforcer together. An effort should be made to make the mixture as homogeneous as is reasonably possible. The components are then partially prereacted (incompletely reacted) in an appropriate vessel. It is important that the reaction not proceed too far or the composition will be crosslinked in the vessel before it can be applied as desired, making application very difficult or impossible. But, enough reaction must be accomplished to overcome incompatibility of the components to give a resin which will not phase separate upon standing, or more preferably, is homogeneous and clear. Thus, it is recommended that the reaction take place at 60 to 120° C. for 0.5 to 10 hours in the presence of a small portion of the catalyst needed to entirely crosslink the composition. It is preferred that the amount of catalyst used in the prereaction step not exceed 50% of the total catalyst needed to obtain the desired amount of crosslinking in the final product and it is most preferred that no more than 1.0% by weight be used. The prereacted mixture is then still in a physical form that allows convenient and easy application thereof as desired.

The prereacted mixture, the rest of the catalyst required for crosslinking, and any other ingredients which are necessary to give a satisfactory coating are then mixed together and applied to a substrate. The substrate is then baked at 100 to 250° C. for 0.01 to 2 hours to effect crosslinking.

Although use of solvent may not be necessary, solvent can be included in with the polymer/reinforcer/amino resin mixture to reduce the viscosity such that the prereacted mixture can be easily stirred during the prereaction or to facilitate application of the finished resin. Suitable solvents include hydrocarbon solvents such as naphtha, mineral spirits, toluene, xylene, etc., and oxygenated solvents such as esters, ketones, ethers and alcohols. A common solvent which is well suited and which was used in much of this work is Shell VM&P Naphtha. If the prereacted resin will be dispersed in water for application as a water based product, use of a water soluble solvent, such as BUTYL OXITOL or diacetone alcohol, may be advantageous. Solvent contents of up to 70%w of the polymer/reinforcer/amino resin/solvent mixture can be used. However, it is highly desirable that the solvent content be 40% by weight or less.

For applications in which the resin must have low viscosity but in which solvent content must be low or even zero, it may be necessary to disperse the prereacted resin in water and apply it as a waterborne composition. In this case, the prereaction and subsequent dispersion would need to be done with little or no solvent present. Dispersion of the prereacted resin in water can be accomplished either by the inversion process or by the direct emulsification process. In the inversion process, the surfactant is added to the organic phase which has been heated to a temperature high enough to give the resin a viscosity low enough that it can be efficiently stirred. Typical temperatures are from about 40 to about 90° C. While stirring the resin vigorously, as with a 4-bladed stirrer rotating at about 2000 rpm, water is slowly added. When a volume of water about equal to the volume of the organic phase has been added, the mixture will invert from organic continuous to water continuous, thereby making the waterborne dispersion. More water is then added to reduce the viscosity to the desired range. In the direct emulsification process, surfactant is added to the required amount of water, typically about 150 parts by weight per 100 parts of organic resin. The organic resin is then dispersed in the soapy water with a high shear mixer, such as a Silverson mixer/emulsifier operating at about 6000 rpm. A wide variety of surfactants could be used, including anionic surfactants, nonionic surfactants and cationic surfactants. A particularly effective surfactant is the anionic surfactant made by neutralizing CYCAT 600 with a tertiary amine such as triethyl amine or dimethylaminoethanol. This compound not only functions as the surfactant to stabilize the dispersion in water but, after the composition is applied to a substrate, the amine evaporates during the bake step, allowing the CYCAT 600 to catalyze the cure with the amino resin.

In the solids portion of the crosslinkable composition, the epoxidized monohydroxylated polydiene polymer should comprise from 10 to 90% by weight (%w) of the polymer/reinforcer/crosslinker composition. The reinforcing agent should comprise from 2 to 40%w of the composition. Thus, the amino resin will comprise from 8 to 60%w of the composition. If the polymer is used at less than 10%w, then the cured composition will be too brittle for most applications. If it is used at more than 90%, then the concentrations of crosslinker and reinforcer will be too low and the composition will not cure to high strength. If the concentration of the reinforcer is too low, then the cured composition will be too soft for many applications, and if it is too high, then the crosslink density will be too high and the composition will again be too brittle. If the concentration of the amino resin is too low, then the strength will not be as high as desired, and if the concentration is too high, then homopolymerization of the amino resin will cause the cured composition to be too brittle.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Pigments will often be included in the composition to give the painted part the desired appearance. Various types of fillers can be included in the formulation. This is especially true for exterior coatings in which fillers are added not only to create the desired appeal but also to improve the performance of the coatings such as their weatherability. A wide variety of fillers can be used. Suitable fillers include calcium carbonate, clays, talcs, silica, zinc oxide, titanium dioxide and the like. The amount of filler usually is in the range of 0 to about 65%w based on the solvent free portion of the formulation depending on the type of filler used and the application for which the coating is intended. An especially preferred filler is titanium dioxide.

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

Coatings are frequently thin, non-sticky, pigmented compositions applied on a substrate to protect or decorate it. Therefore, hydrogenated epoxidized monohydroxylated polymers may be needed to give adequate durability. Resins will be selected to assure maximum durability and minimum dirt pick-up. Fillers and pigment will be selected carefully to give appropriate durability and color. Coatings will frequently contain relatively high solvent concentration or will be waterborne dispersions to allow easy application and give a smooth dry coating.

EXAMPLES

The following examples demonstrate the utility of the epoxidized monohydroxylated polymers in amino resin cured compositions and especially their utility in the method of the present invention. Polymer A was a diblock polymer containing 1.5 meq of epoxy per gram of polymer and having an isoprene block of 2000 number average molecular weight (MW) and containing most of the epoxy functionality and a 4000 number average MW random copolymer block of hydrogenated butadiene and styrene (40% by weight styrene) with the hydroxyl group at the end of the random copolymer block. Polymer B was a diblock polymer containing 1.5 meq of epoxy per gram of polymer and having an isoprene block of 2000 number average MW and containing most of the epoxy functionality and a 4000 number average MW block of hydrogenated polybutadiene with the hydroxyl group at the end of the polybutadiene block. One of the amino resins used was CYMEL® 1141, a liquid, acid functional, methylated/butylated melamine/formaldehyde resin. The other amino resin used was CYMEL 1156, a liquid, butylated melamine/formaldehyde resin of 2.2 functionality. The acid used to catalyze the amino resin/hydroxyl and amino resin/epoxy reactions was CYCAT® 600, dodecyl benzene sulfonic acid (a 70% by weight solution in isopropyl alcohol). Both the CYMEL resins and CYCAT catalyst are made by CYTEC (formerly American Cyanamid).

Coatings made according to the present invention were evaluated for mechanical properties. The pencil hardness (gouge) of the coatings was measured according to the ASTM D3363 method of pushing successively softer pencil leads across the coating until the pencil lead will no longer gouge through the coating. The hardness scale (softest to hardest) is 6B<5B<4B<3B<2B<B<HB<F<H<2H<3H<4H<5H<6H. Rocker hardness was measured by ASTM D2134 using a Sward type hardness rocker. This test measures the number of rocks the rocker will make on the coating before the amplitude decreases from a fixed starting angle to a fixed ending angle. The value is expressed as the percentage of rocks the test sample gave relative to the number of rocks the rocker would make on a glass substrate. Thus, the higher the number, the harder the coating. Adhesion of the coatings was measured with the cross hatch adhesion test, ASTM D3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss).

The other components used in the examples are described in Table 1.

TABLE 1

| Component | Supplier | Description |
|---|---|---|
| Reinforcing Diols | | |
| TMPD Diol | Eastman | 2,2,4-trimethyl-1,3-pentane diol, mp = 54° C. |
| BEPD Diol | Eastman | 2-butyl-2-ethyl-1,3-propane diol, mp = 40° C. |
| Solvents | | |
| VM & P Naphtha HT | Shell | Aliphatic hydrocarbon mixture, bp = 119–139° C. |

Example 1

A selection of coating compositions based on epoxidized monohydroxylated polydiene polymers was tested on steel panels which were primed with the cathodic electrodeposition (CED) epoxy primer specified for use on Ford cars (APR 16900 purchased from Advanced Coating Technologies, Inc.). The resins were also tested on unprimed steel (QD412 from Q-Panel Corp.) and on Thermoplastic Polyolefin (DEXFLEX 880 TPO purchased from Standard Plaque, Inc.). The compositions of the resins are given in Table 2. All of the resins were prepared by cooking them in a resin kettle for 1 or 2 hours at 100° C. at 60%w solids in Shell VM&P Naphtha solvent. All the resins were clear, nearly colorless, fairly low viscosity liquids. They were applied to the substrates with a #52 wire rod and were cured by baking 30 minutes at 121° C. Properties are shown in the Table 2.

Results of the crosshatch adhesion test show that the coating compositions based on Polymer A give good crosshatch adhesion to unprimed steel but poor adhesion to TPO. However, the coating compositions based on Polymer B give good to excellent adhesion to TPO but very poor adhesion to unprimed steel. Results also show that all of the coating compositions gave excellent crosshatch adhesion to the CED epoxy primed steel. Thus, any of these coating compositions would be a candidate for use in coatings over this epoxy primer. It is likely that the epoxy primer coating has residual functional groups which can react with the melamine resin in the coating composition giving excellent bonding between the primer and the coating composition.

TABLE 2

Adhesion or Coatings to Various Substrates[a]

| Composition, pbw | 1 | 2 | 3 | 4 | 5 |
|---|---|---|---|---|---|
| Polymer A | 60 | 50 | | | |
| Polymer B | | | 40 | 40 | 40 |
| TMPD Diol | 10 | 15 | | 20 | 20 |
| BEPD Diol | | | 20 | | |
| CYMEL 1156 | | | 40 | 40 | |
| CYMEL 1141 | 30 | 35 | | | 40 |
| CYCAT 600 | 1 | 1 | 1 | 1 | 1 |
| VM & P Naphtha | 67 | 67 | 67 | 67 | 67 |
| Cook Time, hr | 2 | 1 | 2 | 2 | 2 |
| Cook Temp, C | 100 | 100 | 100 | 100 | 100 |
| Properties on Unprimed Steel[b] | | | | | |
| Thickness, mil | 1.5 | 1.2 | 1 | 1 | 1.1 |
| Pencil Hardness | >4H | >4H | HB | HB | H |
| Rocker Hardness | | | 8 | 5 | 7 |
| Crosshatch Adhesion | 4 | 4 | 0 | 0 | 0 |

TABLE 2-continued

Adhesion or Coatings to Various Substrates[a]

| Composition, pbw | 1 | 2 | 3 | 4 | 5 |
|---|---|---|---|---|---|
| Properties on TPO[c] | | | | | |
| Crosshatch Adhesion | 0 | | 5 | 4 | 3 |
| Properties on CED Primed Steel[d] | | | | | |
| Thickness, mil | 2.4 | 2.3 | 2.0 | 2.0 | 2.2 |
| Pencil Hardness | 4H | 4H | H | H | H |
| Rocker Hardness | 12 | 7 | 7 | 4 | 4 |
| Crosshatch Adhesion | 5 | 5 | 5 | 5 | 3 |

[a]Resins were cooked for 1–2 hours at 100° C. with 0.4 parts by weight (pbw) CYCAT 600 in a resin kettle. CYCAT level was raised to 1 pbw prior to casting films.
[b]Unprimed steel substrate was QD412 panels from Q-Panel Corp.
[c]Thermoplastic Polyolefin (TPO) substrate was DEXFLEX 880 from Standard Plaque.
[d]CED primed steel was APR 16900 (Ford spec) from ACT.

Example 2

Basecoat/Clearcoat Combinations

A system for painting a car would consist of at least three layers (primer/basecoat/clearcoat) or four layers (primer/surfacer/basecoat/clearcoat). Table 3 presents prototype formulations for a basecoat and two clearcoats intended to demonstrate the suitability of resins based on Polymer B for use in automotive coatings. The resins in Basecoat 3-1 and Clearcoat 3-2 were cooked for 2 hours at 100° C. with 0.4 parts by weight (pbw) of CYCAT 600. Before casting films, the catalyst level was increased to 1 pbw in all three coatings and the stabilizers (IRGANOX 1076, TINUVIN 328 and TINUVIN 123, supplied by Ciba Geigy) were added to Clearcoats 3-2 and 3-3. Basecoat 3-1 used TiO$_2$ (TiPure R-706 from DuPont) at 50%w on a solids basis as the pigment. Clearcoat 3-3 was a polyester polyol (DESMOPHEN 670A-80 from Bayer) cured with a methylated melamine/formaldehyde resin (CYMEL 303 from CYTEC).

Basecoat 3-1 was applied to DEXFLEX 880 TPO to CED epoxy primed steel (APR 16900) and to primer/surfacer coated steel (Ford spec. APR 29401 purchased from Advanced Coating Technologies, Inc.) using a #52 wire rod and the panels were cured by baking 30 minutes at 121° C. Clearcoats 3-2 and 3-3 were then applied onto the cured basecoat and the panels were again baked 30 minutes at 121° C. to cure the clearcoats. It was found that the Basecoat 3-1 gave excellent adhesion to all three substrates in the crosshatch adhesion test and that Clearcoats 3-2 and 3-3 both gave excellent adhesion to Basecoat 3-1 in the crosshatch adhesion test.

These results demonstrate that basecoat compositions based on the epoxidized monohydroxylated polydiene polymers are suitable candidates for use in coatings not only for TPO but also for the primed metal parts of the car as well. They have excellent crosshatch adhesion to TPO and to the primed metal substrates which are typically used by Ford. They also have excellent intercoat adhesion with the polyester/melamine clearcoat as well as to the clearcoat made from another epoxidized monohydroxylated polydiene resin.

TABLE 3

Basecoat/Clearcoat Combinations

| Coating Composition, pbw | Basecoat 3-1 | Clearcoat 3-2 | Clearcoat 3-3 |
|---|---|---|---|
| Polymer B | 40 | 30 | |
| DESMOPHEN 670A-80 | | | 87.5 |
| TMPD Diol | 20 | | |
| BEPD Diol | | 20 | |
| CYMEL 1156 | 40 | 50 | |
| CYMEL 303 | | | 30 |
| CYCAT 600 | 1 | 1 | 1 |
| IRGANOX 1076 | | 0.5 | 0.5 |
| TINUVIN 328 | | 1 | 1 |
| TINUVIN 123 | | 1 | 1 |
| VM & P Naphtha | 67 | 67 | |
| Xylene | | | 28 |
| TiPure R-706 | 100 | | |

I claim:

1. A method for painting a substrate which comprises:
   (a) priming the substrate with a primer selected from the group consisting of epoxy resin primers and polyester resin primers,
   (b) applying to the primed substrate a crosslinkable basecoat composition comprising from 10 to 90 percent by weight of an epoxidized monohydroxylated polydiene polymer, from 8 to 60 percent by weight of an amino resin crosslinking agent, and from 2 to 40 percent by weight of a reinforcing agent, and
   (c) applying over the basecoat a clearcoat selected from the group consisting of epoxidized monohydroxylated polydiene-based clearcoats, polyester clearcoats, and acrylic clearcoats.

2. The method of claim 1 wherein said polymer has been epoxidized such that it contains from 0.2 to 7.0 meq of epoxy per gram of polymer.

3. The method of claim 1 wherein the reinforcing agent is selected from the group consisting of ethylene glycol, 1,3-propane diol, 1,4-butane diol, 1,6-hexane diol, 1,2-propane diol, 2-methyl-1,3-propane diol, 2-ethyl-1,3-hexane diol, 2,2,4-trimethyl-1,3-pentane diol, 2-butyl-2-ethyl-1,3-propane diol, cyclohexane dimethanol, 4,4-isopropylidene-dicyclohexanol, Bisphenol A, neopentyl glycol, glycerol, trimethylolethane, and trimethylol propane.

4. The method of claim 1 wherein the polymer is an epoxidized monohydroxylated polydiene polymer which has the formula

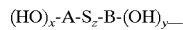

$$(HO)_x\text{-A-S}_z\text{-B-(OH)}_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1, and wherein the polymer contains from 0.2 to 7.0 meq of epoxy per gram of polymer.

5. The method of claim 1 wherein the polymer is an epoxidized monohydroxylated polydiene polymer which has the formula

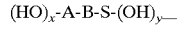

$$(HO)_x\text{-A-B-S-(OH)}_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1 and wherein the polymer has an epoxy content of from 0.2 to 7.0 meq of epoxy per gram of polymer.

6. The product of the process of claim 1.

* * * * *